June 10, 1924.

P. M. MATTHEW 1,497,112

APPARATUS FOR VULCANIZING RUBBER GOODS

Filed Aug. 22, 1922    2 Sheets-Sheet 2

Patented June 10, 1924.

1,497,112

UNITED STATES PATENT OFFICE.

PATRICK MILLAR MATTHEW, OF EDINBURGH, SCOTLAND.

APPARATUS FOR VULCANIZING RUBBER GOODS.

Application filed August 22, 1922. Serial No. 583,520.

*To all whom it may concern:*

Be it known that I, PATRICK MILLAR MATTHEW, a subject of the King of the United Kingdom of Great Britain and Ireland, and residing at Edinburgh, Scotland, have invented a certain new and useful Improvement in Apparatus for Vulcanizing Rubber Goods, of which the following is a specification.

This invention relates to a process of and apparatus for the vulcanization of rubber goods, e. g., sheet rubber and textile fabrics combined with rubber, and aims at the continuous vulcanization of such materials as rubber coated floor-cloth, printers' blanket, insertion sheet, belting, etc., which are ordinarily vulcanized under stationary pressure, the treatment being also applicable to such goods as waterproof fabrics and the like.

The process consists in passing the material to be vulcanized around a slowly rotating drum or cylinder of large diameter, heated internally to the required temperature, and simultaneously therewith subjecting it to intermittent and rapidly recurring pressure against the surface of the heated drum, or cylinder, during the period of vulcanization, which may be varied according to the thickness of the material to be treated. The width of the face of the drum or cylinder may be varied in accordance with the width of material to be treated.

The intermittent pressure is imparted by pressure rollers of any desired number which may be heated or not, as required.

The pressure rollers may be mounted in any convenient manner, but I prefer to arrange them so that their ends or journals are carried in bearings sustained by two rings coaxial with the drum or cylinder and disposed one at each end thereof, the rings being oscillated by suitable mechanical means, at a higher speed than the speed of rotation of the drum, whereby the rollers are kept in motion to and fro over the outer surface of the material during its passage over the drum or cylinder; the rollers being thus bodily movable in an arcuate path coaxial with the drum or cylinder.

The rings may be centred on the shaft carrying the drum or cylinder or may have bearings on surfaces on the ends of the drum or cylinder.

The outer face of the cylinder may be polished, engraved, grained, figured or otherwise formed to impart any desired profile or facing to the vulcanized goods.

Figure 1:
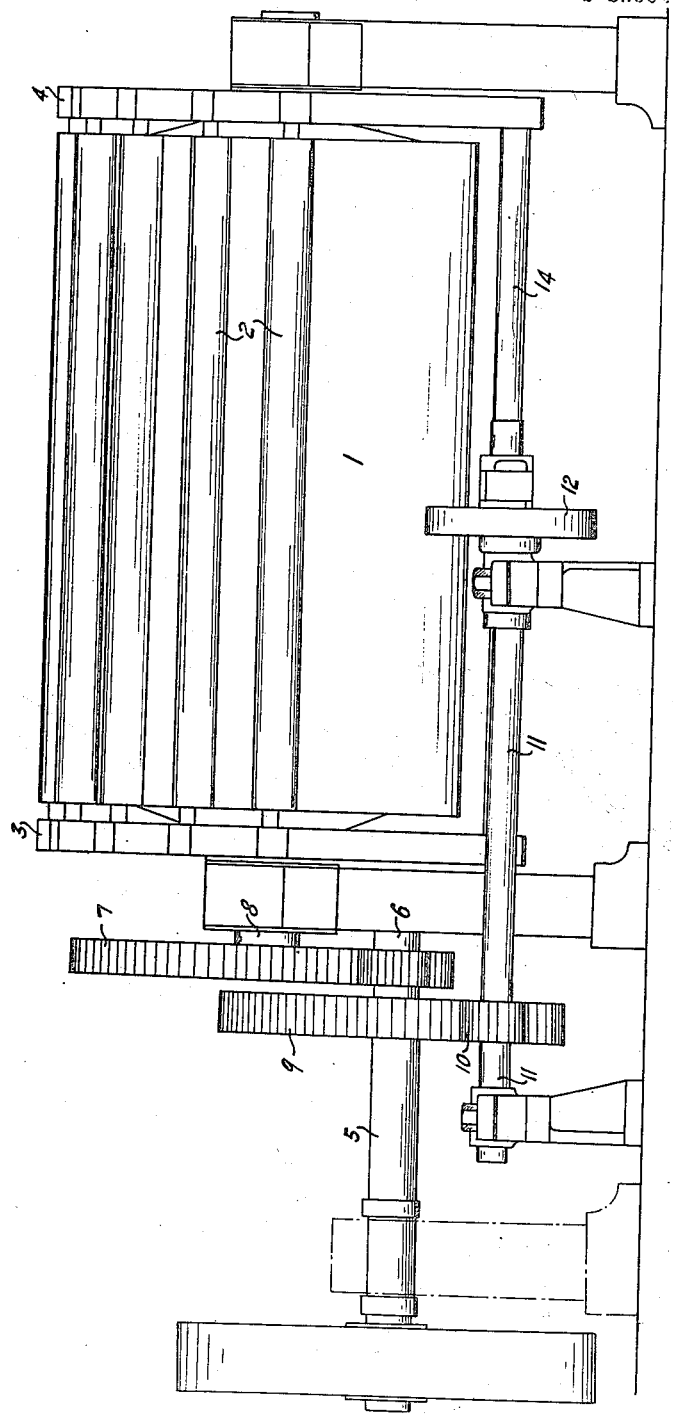
Figure 2:
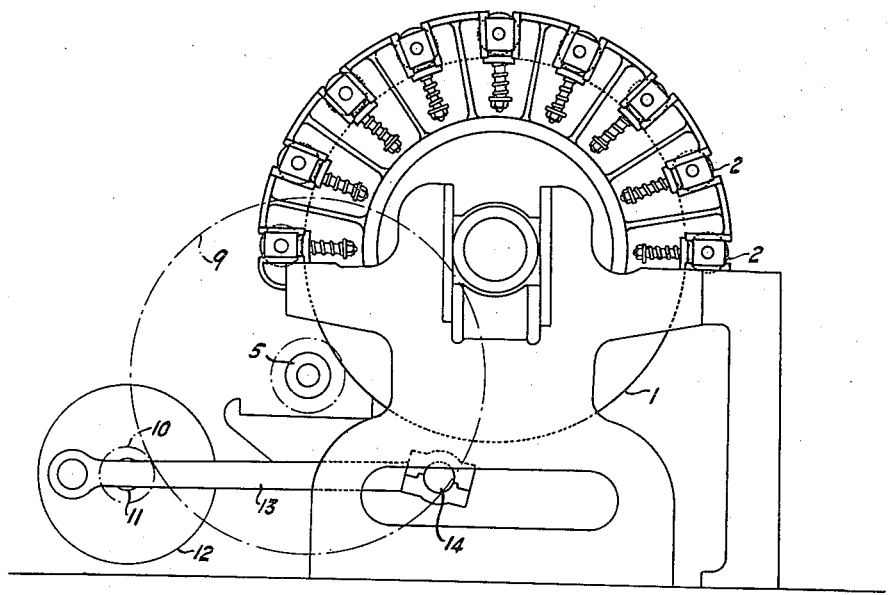
Figure 3:
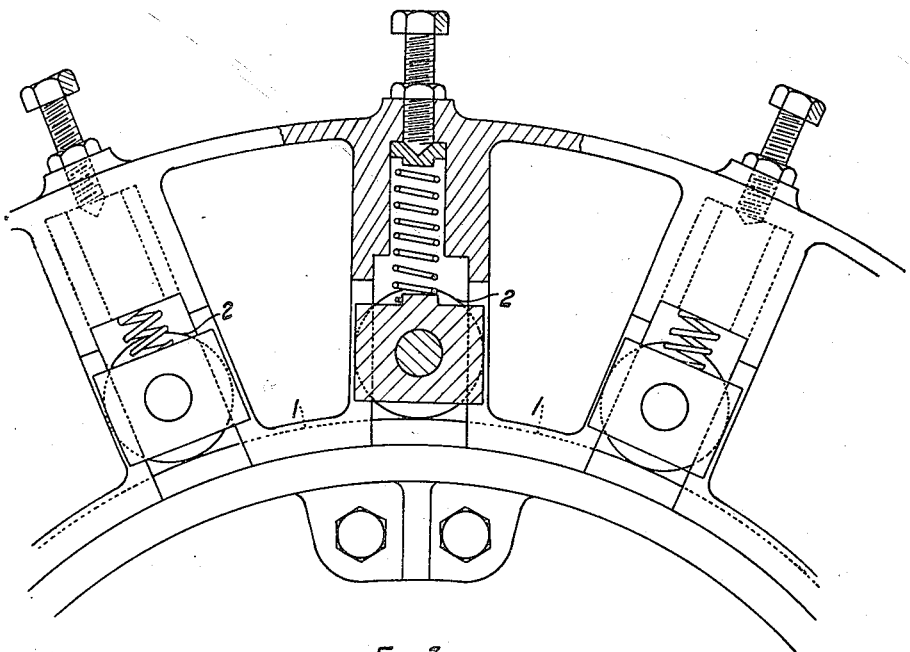

In the accompanying drawings Fig. 1 is a side elevation and Fig. 2 an end view of apparatus according to the invention. Fig. 3 is a detail view showing a modified arrangement for regulating the pressure of the rollers.

The apparatus shown comprises a rotary drum or cylinder 1 of large diameter adapted to be heated internally to the required temperature, and pressure rollers 2 adapted to apply intermittent and rapidly recurring pressure to the goods interposed between the rollers 2 and the surface of the drum or cylinder 1.

The ends or trunnions of the rollers 2 are carried in bearings sustained by two rings 3, 4 coaxial with the drum or cylinder 1 and disposed one at each end thereof, the rings 3, 4 being oscillated at high speed compared with the speed of rotation of the drum or cylinder 1.

In the form shown, the driven shaft 5 carries a spur pinion 6 meshing with a large spur wheel 7 fixed on the shaft 8 carrying the drum or cylinder 1 and carries also a large spur wheel 9 meshing with a pinion 10 on a shaft 11 connected by a crank 12 and link 13 with a bar 14 sustained between the rings 3, 4.

The pressure of the rollers may be regulated by springs, screws, or other suitable means. Two arrangements for regulating the pressure are shown in Figs. 2 and 3. The regulating arrangements may be modified.

I claim:—

1. Vulcanizing apparatus comprising a rotary drum and pressure rollers bodily movable in an arcuate path coaxial with said drum.

2. Vulcanizing apparatus comprising a rotary drum around which is passed the material to be vulcanized, rings coaxial with said drum, bearings carried by said rings, pressure rollers mounted in said bearings and means for oscillating said rings.

3. Vulcanizing apparatus comprising a rotary drum and pressure rollers grouped around said drum, said rollers rotatable around their own axes and movable to and fro in a path coaxial with the drum.

4. Vulcanizing apparatus comprising a rotary drum, pressure rollers bodily movable in an arcuate path coaxial with said drum, means for rotating the drum and means for imparting to the rollers bodily movement in said arcuate path at an angular speed exceeding the angular speed of the drum.

5. Vulcanizing apparatus comprising a rotary drum, pressure rollers arranged in an arc coaxial with the drum, a support for said rollers and means for oscillating said support.

6. Vulcanizing apparatus comprising a rotary drum, pressure rollers distributed around the periphery of the drum and means for moving said rollers to and fro around the axis of the drum.

7. Vulcanizing apparatus comprising a rotary drum, a series of pressure rollers each rotatable around an axis parallel with the axis of the drum, supporting means for said rollers, means for rotating said drum and means for moving said supporting means angularly at a speed differing from the angular speed of the drum.

In testimony whereof I have signed my name to this specification in the presence of two subscribing witnesses.

PATRICK MILLAR MATTHEW.

Witnesses:
T. H. SIMPSON WITHERS,
R. G. PADEN.